(12) United States Patent
Bejin

(10) Patent No.: US 7,338,104 B1
(45) Date of Patent: Mar. 4, 2008

(54) TRANSFIGURABLE ACCESS SLIDING TRAY

(75) Inventor: Peter Bejin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/536,311

(22) Filed: Sep. 28, 2006

(51) Int. Cl.
*B62D 33/02* (2006.01)

(52) U.S. Cl. .................. 296/26.09; 296/39.2; 414/537; 414/522; 224/403; 224/496; 224/510

(58) Field of Classification Search ............... 296/39.2, 296/26.09, 26.1, 26.01, 61; 414/537, 522; 224/403, 496, 510
See application file for complete search history.

(56) References Cited

U.S. PATENT DOCUMENTS

| | | | |
|---|---|---|---|
| 3,870,170 A | * | 3/1975 | Noble et al. ................ 414/537 |
| 4,900,217 A | * | 2/1990 | Nelson ....................... 414/537 |
| 4,990,049 A | | 2/1991 | Hargrove |
| 5,090,335 A | | 2/1992 | Russell |
| 5,820,190 A | * | 10/1998 | Benner ..................... 296/26.09 |
| 5,829,945 A | | 11/1998 | Stanley |
| 5,924,753 A | | 7/1999 | DiBassie |
| 6,464,274 B2 | | 10/2002 | Mink et al. |
| 6,491,331 B1 | | 12/2002 | Fox |
| 6,991,277 B1 | | 1/2006 | Esler |

* cited by examiner

*Primary Examiner*—Joseph D Pape
(74) *Attorney, Agent, or Firm*—Gigette Bejin, Esq.; Dykema Gossett PLLC

(57) ABSTRACT

A transfigurable bed liner assembly mountable on a vehicle including a bed. The assembly may include a channel mountable to each side wall of the vehicle, and a transfigurable bed liner including a plurality of rollers disposable in the channels for permitting sliding of the transfigurable bed liner. The transfigurable bed liner may include a leg generally adjacent a first end thereof for supporting the transfigurable bed liner in an extended position, for use of the bed liner, for example, as a workbench and for permitting loading of heavy objects.

16 Claims, 5 Drawing Sheets

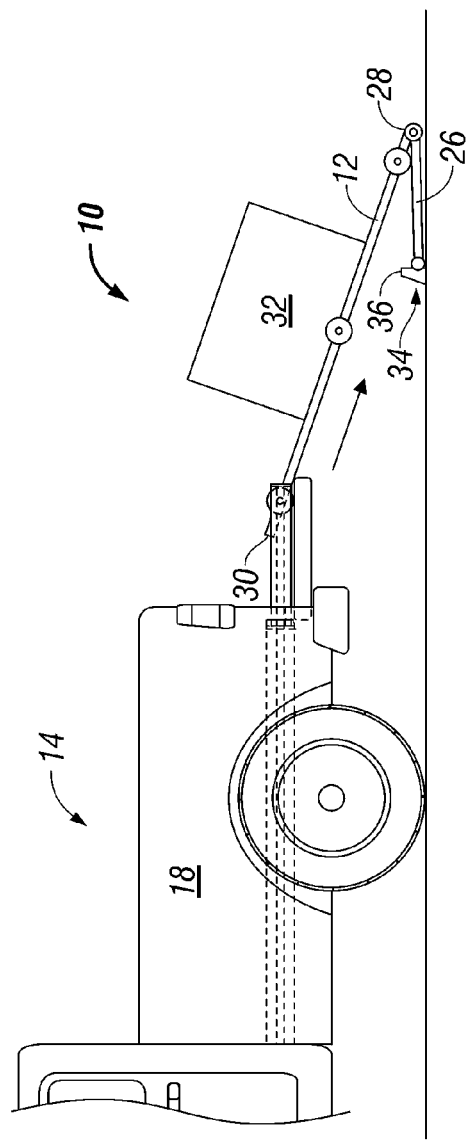
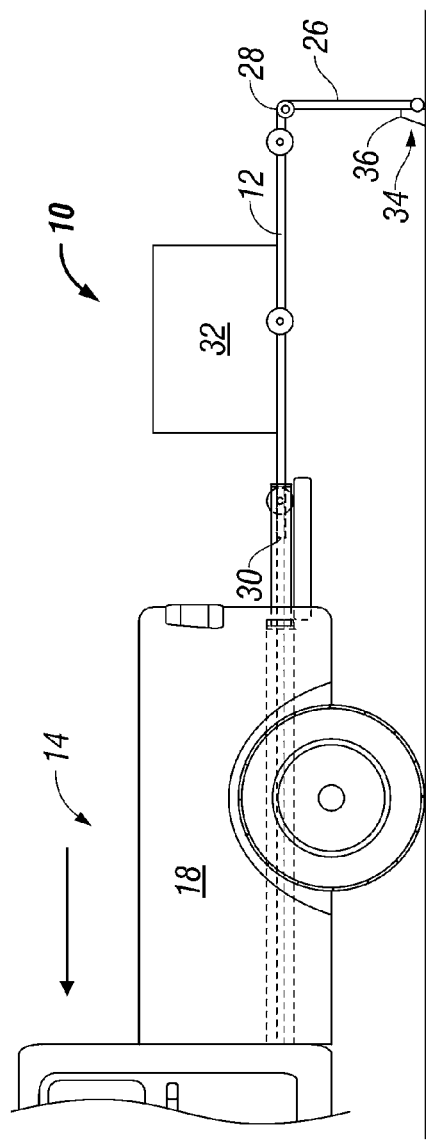
FIG. 3
FIG. 4

TRANSFIGURABLE ACCESS SLIDING TRAY

BACKGROUND OF INVENTION a. Field of Invention

The invention relates generally to components for pick up trucks, vans, SUVs and other such vehicles with flat beds, and more particularly, to a transfigurable access sliding tray for facilitating access to items and areas disposed generally out of a user's reach, with the tray being configurable for further facilitating loading and unloading of items.

b. Description of Related Art

As is known in the art, pick up trucks, vans, SUVs and other such vehicles generally include a flat bed or similar area for permitting storage of items generally larger than or in a greater capacity than typical sedan automobiles. Pick up trucks for example generally include a flat bed accessible by reaching over the side walls of the bed area, or by a user climbing onto the bed area. For pick up trucks including a bed cover or when a tailgate is lowered, such access to items and areas disposed adjacent the truck's cab area can be quite difficult and time-consuming. Such is of course true for vans, SUVs and other such vehicles.

Further, loading of heavy objects into such vehicles can also be difficult in that a user must lift an object and then slide the object into the vehicle. For excessively heavy objects, such a task can be virtually impossible for certain users, and can even lead to injury if a user is not properly trained or capable of lifting, loading and/or unloading an heavy object.

In an effort to facilitate such loading and unloading of heavy objects, the art includes a variety of extendable bed mounted devices which can be extended or retracted as needed.

For example, referring to FIGS. 1, 3 and 5 of U.S. Pat. No. 4,990,049 to Hargrove, there is disclosed an extendable bed liner which functions as a ramp for loading cargo as well as a workbench for further operations. The Hargrove bed liner is however mounted to the vehicle bed, which limits its operable width as well as the versatility of the bed liner for loading and unloading objects.

Additional bed liners are disclosed in U.S. Pat. Nos. 5,090,335, 5,829,945, 5,924,753 and 6,464,274. For example, referring to FIG. 1 of U.S. Pat. No. 5,924,753 to DiBassie, there is disclosed a bed extender 10 including telescoping pieces 22 that attach to the inner side of pickup bed 3 extending the vehicle cargo space. However, the bed extender does not function as a ramp for loading or unloading cargo, or as a workspace.

It is therefore desirable to provide a vehicle bed liner which may be readily mountable to existing vehicles or vehicles in an assembly line without requiring significant modification to the vehicle structure. It is also desirable to provide a vehicle bed liner which is capable of a variety of operations including, for example, extending/retracting from a vehicle bed, facilitating loading and unloading of objects and being operable as a work bench, with the overall design being simple and economical to manufacture, assemble and use.

SUMMARY OF THE INVENTION

The invention solves the problems and overcomes the drawbacks and deficiencies of prior art vehicle bed liner designs by providing a transfigurable bed liner assembly mountable to a vehicle including a bed. The assembly may include one or more channels mounted to a side wall of the vehicle, and a transfigurable bed liner including a plurality of rollers disposable in the channels for permitting sliding of the transfigurable bed liner.

For the assembly described above, the transfigurable bed liner may include one or more legs generally adjacent a first end thereof for supporting the transfigurable bed liner in an extended position. In a particular configuration of the present invention, the leg may be pivotable or otherwise attachable to an end of the bed liner. The transfigurable bed liner may also be pivotable relative to the vehicle bed at a second end thereof. In a particular configuration, the aforementioned channel may be a primary C-channel. The assembly may also include a secondary C-channel disposed in the primary C-channel, with the secondary C-channel being slidable relative to the primary C-channel to enable pivotal movement of the transfigurable bed liner.

The invention also provides a transfigurable bed liner assembly mountable to a vehicle including a bed. The assembly may include one or more guides mounted to a side support of the vehicle, and a transfigurable bed liner including a plurality of sliders disposable in or on the guides for permitting sliding of the transfigurable bed liner.

For the assembly described above, the transfigurable bed liner may include one or more legs generally adjacent a first end thereof for supporting the transfigurable bed liner in an extended position. In a particular configuration of the present invention, the leg may be pivotable or otherwise attachable to an end of the bed liner. The transfigurable bed liner may also be pivotable relative to the vehicle bed at a second end thereof. In a particular configuration, the aforementioned guide may be a primary C-channel. The assembly may also include a secondary C-channel disposed in the primary C-channel, with the secondary C-channel being slidable relative to the primary C-channel to enable pivotal movement of the transfigurable bed liner.

Yet further, the invention provides a method of loading and unloading a heavy object into a vehicle including a bed. The method may include the steps of substantially fixedly mounting one or more channels to a side wall of the vehicle, and slidably mounting a transfigurable bed liner including a plurality of rollers in the channels for permitting sliding of the transfigurable bed liner. The method may further include the steps of extending the transfigurable bed liner away from the vehicle, pivoting the transfigurable bed liner in a downward direction relative to the vehicle at a first end of the transfigurable bed liner, loading the object onto the transfigurable bed liner, and fixing a first end of a leg pivotally mounted to the transfigurable bed liner. The method may also include the steps of moving the vehicle in a forward direction to allow raising of the transfigurable bed liner, and retracting the transfigurable bed liner toward the vehicle to load the object into the vehicle.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 3 is an illustrative view of the transfigurable vehicle bed liner of FIG. 1, showing the bed liner in an initial extended ramp position for facilitating loading of a heavy object;

FIG. 4 is an illustrative view of the transfigurable vehicle bed liner of FIG. 1, showing the bed liner in an intermediate extended ramp position for facilitating loading of a heavy object;

DETAILED DESCRIPTION OF THE PREFERRED EMBODIMENTS

Figure 1:
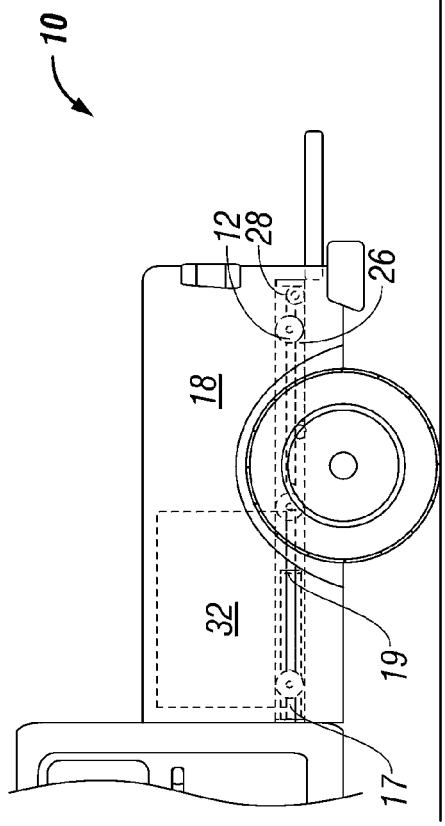
FIG. 1 is an illustrative view of a transfigurable vehicle bed liner according to the present invention, showing the bed liner in a retracted position with an object disposed adjacent the vehicle cab area.

Referring now to the drawings wherein like reference numerals designate corresponding parts throughout the several views, FIGS. 1-9 illustrate various views of a transfigurable vehicle bed liner (hereinafter "transfigurable bed liner") according to the present invention, and its various components for facilitating movement of the bed liner.

Figure 2:
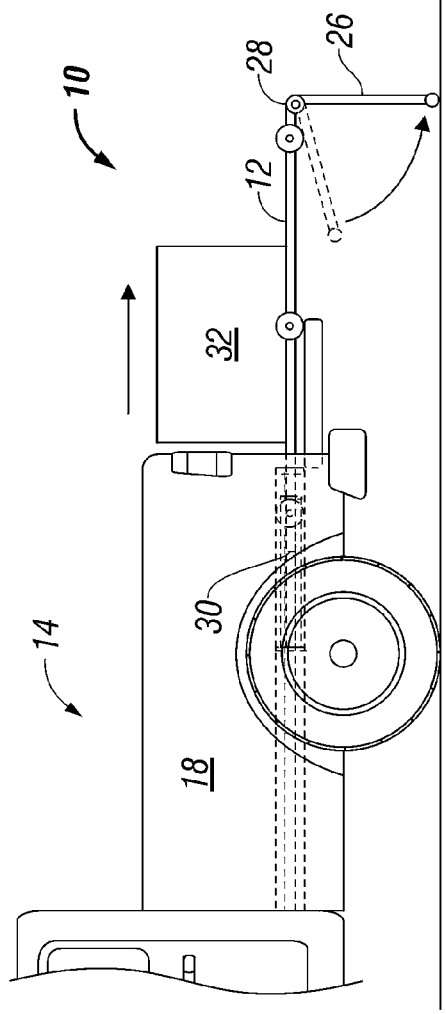
FIG. 2 is an illustrative view of the transfigurable vehicle bed liner of FIG. 1, showing the bed liner in an extended position with the bed liner legs rotated for supporting the bed liner in a generally horizontal position.
Figure 5:
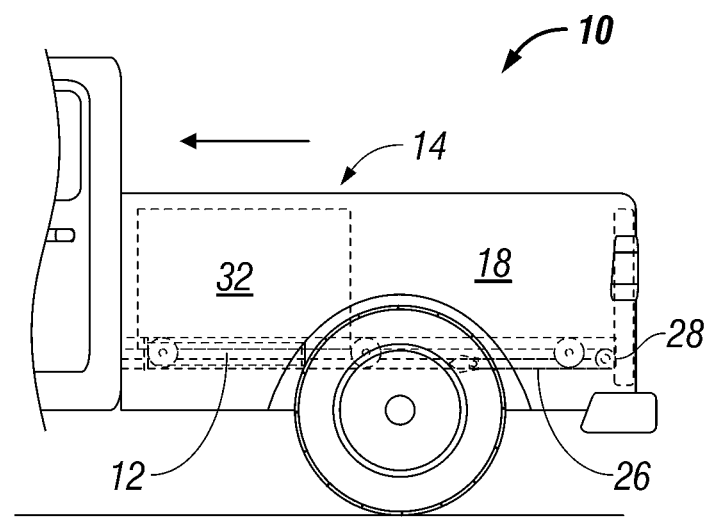
FIG. 5 is an illustrative view of the transfigurable vehicle bed liner of FIG. 1, showing the bed liner in a retracted ramp position from its intermediate position of FIG. 4.
Figure 6:
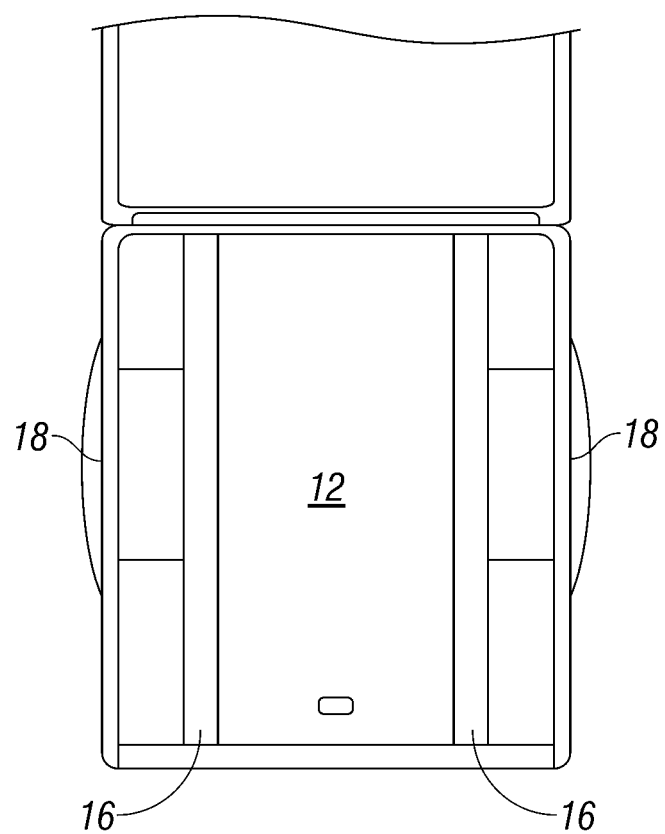
FIG. 6 is a plan view of the transfigurable vehicle bed liner of FIG. 1, showing the bed liner disposed in a retracted position on a vehicle bed.
Figure 7:
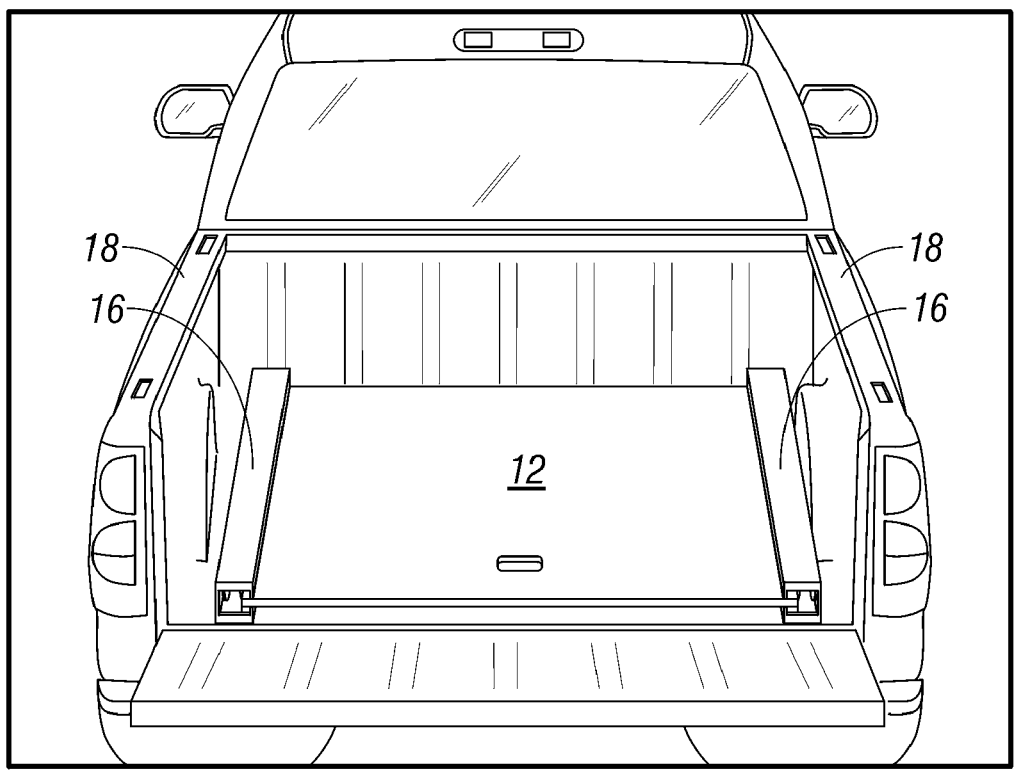
FIG. 7 is a front view of the transfigurable vehicle bed liner of FIG. 1, showing primary and secondary C-channels for supporting and permitting sliding of the bed liner.
Figure 8:
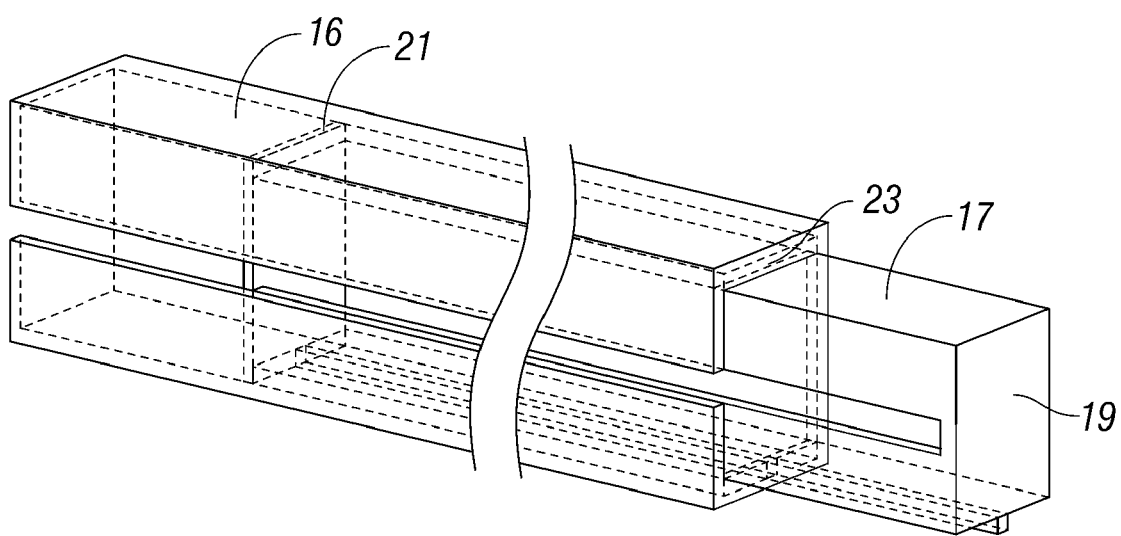
FIG. 8 is an enlarged view of the primary and secondary C-channels of FIG. 7.
Figure 9:
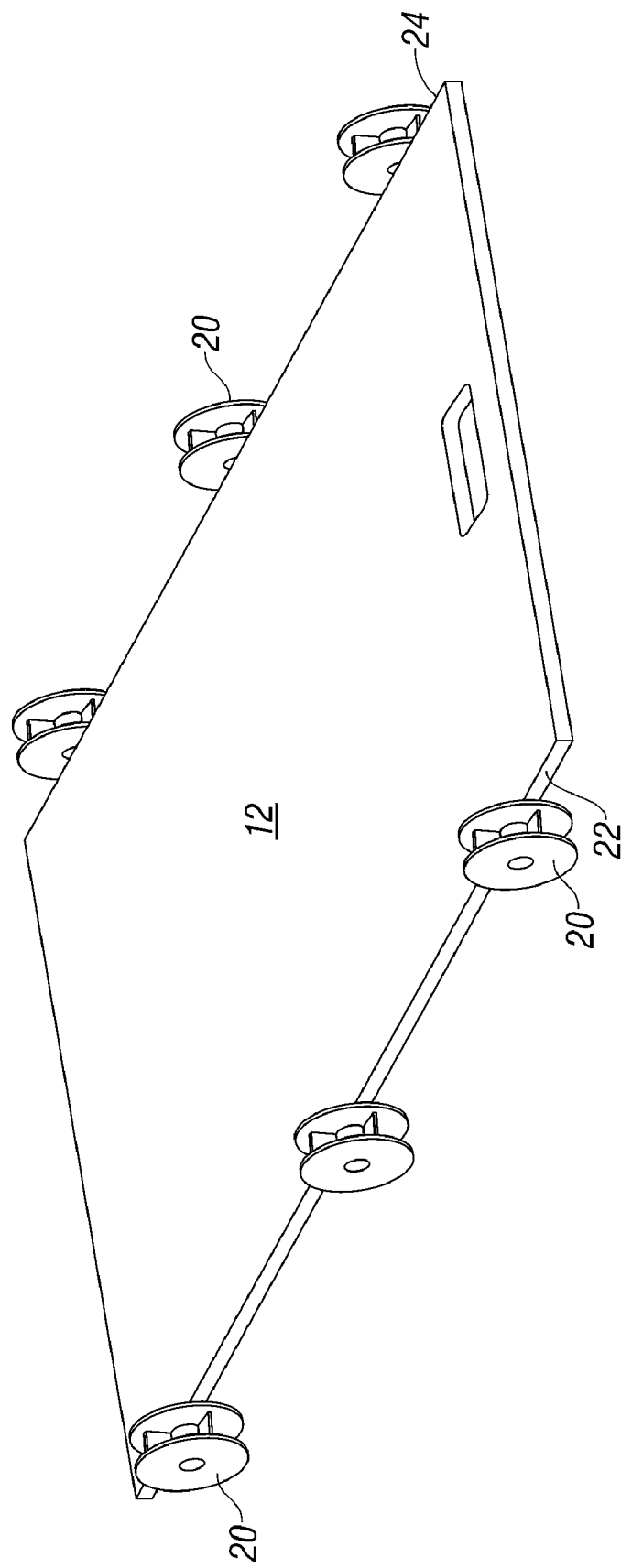
FIG. 9 is an illustrative isometric view of the transfigurable vehicle bed liner of FIG. 1.

Referring to FIG. 1, the invention generally provides a vehicle 10 including transfigurable bed liner 12 slidably mounted in bed 14 of the vehicle. Vehicle 10 may be a pick up truck, a SUV, van or another such vehicle including a flat or otherwise open bed area. Referring to FIGS. 1 and 6-9, transfigurable bed liner 12 may be slidably mounted to bed 14 by means of primary C-channel rails 16 fixedly attached to side walls 18 (or additionally mounted supports) of the vehicle, and secondary C-channel rails 17 slidably disposed in the primary C-channel rails. A plurality of rollers 20 may be disposed along sides 22, 24 of transfigurable bed liner 12 and inserted into the C-channel rails for permitting sliding of liner 12. Once assembled into the C-channels rails, the outer ends of the secondary C-channels may include stops 19 for preventing inadvertent removal of the bed liner, and the ends of the primary C-channel rails may include stops 23 which contact stops 21 on the secondary C-channel rails for likewise preventing removal of the secondary C-channel rails. Alternatively, spring biased detents which project into complementary holes in the secondary C-channel rails may be provided, or secondary C-channel rail 17 may be formed (without stops) of a length sufficient for allowing extension and pivotal movement of bed liner 12, with secondary C-channel rail 17 only being removable from primary C-channel rail 16 upon full withdrawal of the secondary C-channel rail from the primary C-channel rail. As shown in FIGS. 2 and 3, a leg 26 may be pivotally mounted at end 28 of transfigurable bed liner 12 which is itself pivotable relative to bed 14 by the rollers adjacent end 30. Leg 26 and end 28 of bed liner 12 may include a conventional hole/pin type of pivotal connection for allowing pivotal movement of leg 26 and bed liner 12.

In order to operate transfigurable bed liner 12 for loading and unloading objects, referring to FIGS. 1 and 2, in order to unload an object, transfigurable bed liner 12 may be simply retracted away from the vehicle to unload an object 32 as needed. As shown in FIG. 2, in order to facilitate unloading of object 32 or further operations on object 32, legs 26 may be pivoted as shown for allowing the transfigurable bed liner to be maintained in a generally horizontal configuration and used as a workbench. Alternatively, as shown in FIG. 3, leg 26 may be maintained in a folded configuration for permitting object 32 to be slid downwards as shown.

For loading of object 32, transfigurable bed liner 12 may first be pivoted downward as shown in FIG. 3 and loaded onto the bed liner, with legs 26 disposed in the folded configuration. Legs 26 may then be fixed at location 34 by means of a mount 36. Vehicle 10 may then be driven or otherwise moved on a forward direction (i.e. left direction in FIG. 4) so that leg 26 rotates in a counter clockwise direction relative to mount 36 and allows the bed liner to be raised upwards. With transfigurable bed liner 12 raised upwards as shown in FIG. 4, the bed liner may be simply slid towards the vehicle to load the object as needed.

Those skilled in the art would readily appreciate in view of this disclosure that various modifications could be made to the transfigurable bed liner 12 described above, without departing from the scope of the present invention. For example, instead of the bed liner being mounted to a vehicle with a bed, it is conceivable that the bed liner may be attachable to the trunk of a sedan or another vehicle for permitting loading and unloading of heavy objects. Further, instead of C-channel rails, other types of channels or guides may be used with bed liner 12 for permitting sliding of bed liner 12.

To summarize, the present invention thus provides a vehicle bed liner which may be readily mountable to existing vehicles or vehicles in an assembly line without requiring significant modification to the vehicle structure. The invention also provides a vehicle bed liner which is capable of a variety of operations including, for example, extending/retracting from a vehicle bed, facilitating loading and unloading of objects and being operable as a work bench, with the overall design discussed above being simple and economical to manufacture, assemble and use.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A transfigurable bed liner assembly mountable to a vehicle including a bed, said assembly comprising:
   at least one channel mountable to a side wall of the vehicle; and
   a transfigurable bed liner including a single liner panel and a plurality of rollers disposable in said channel for permitting sliding of said transfigurable bed liner relative to the vehicle, said transfigurable bed liner being pivotable relative to the vehicle, wherein said transfigurable bed liner includes an exposed surface for permitting placement of an object on said exposed surface and sliding of said transfigurable bed liner with the object into the vehicle bed without requiring a user to climb onto the vehicle bed or to move the object from said transfigurable bed liner, and further permitting removal of the object from the vehicle bed by sliding of said transfigurable bed liner from the vehicle bed.

2. An assembly according to claim 1, wherein said transfigurable bed liner includes at least one leg generally adjacent a first end thereof for supporting said transfigurable bed liner in an extended position.

3. An assembly according to claim 2, wherein said leg is pivotable.

4. An assembly according to claim 1, wherein said channel is a primary C-channel.

5. An assembly according to claim 4, further comprising a secondary C-channel disposed in said primary C-channel, said secondary C-channel being slidable relative to said primary C-channel to enable pivotal movement of said transfigurable bed liner.

6. A transfigurable bed liner assembly mountable to a vehicle including a bed, said assembly comprising:
- at least one guide mountable to a support of the vehicle; and
- a transfigurable bed liner including a plurality of sliders disposable in or on said guide for permitting sliding of said transfigurable bed liner relative to the vehicle, said transfigurable bed liner being pivotable relative to the vehicle,
- wherein said transfigurable bed liner includes an exposed surface for permitting placement of an object on said exposed surface and sliding of said transfigurable bed liner with the object into the vehicle bed without requiring a user to move the object from said transfigurable bed liner, and further permitting removal of the object from the vehicle bed by sliding of said transfigurable bed liner from the vehicle bed.

7. An assembly according to claim 6, wherein said transfigurable bed liner includes at least one leg generally adjacent a first end thereof for supporting said transfigurable bed liner in an extended position.

8. An assembly according to claim 7, wherein said leg is pivotable.

9. An assembly according to claim 6, wherein said guide is a primary C-channel.

10. An assembly according to claim 6, wherein said sliders are rollers.

11. An assembly according to claim 9, further comprising a secondary C-channel disposed in said primary C-channel, said secondary C-channel being slidable relative to said primary C-channel to enable pivotal movement of said transfigurable bed liner.

12. A transfigurable bed liner assembly mountable to a vehicle including a bed, said assembly comprising:
- at least one channel mountable to a side wall of the vehicle;
- a transfigurable bed liner including a plurality of rollers disposable in said channel for permitting sliding of said transfigurable bed liner;
- at least one leg pivotally mounted generally adjacent a first end of said transfigurable bed liner for supporting said transfigurable bed liner in an extended position; and
- at least one mount engageable with an end of said leg when said leg is disposed at an acute angle relative to said transfigurable bed liner, said mount configured to prevent movement of
- said leg and permit rotation of said leg and lifting of said transfigurable bed liner upon movement of the vehicle.

13. An assembly according to claim 12, wherein said transfigurable bed liner is pivotable relative to the vehicle bed at a second end thereof.

14. An assembly according to claim 12, wherein said channel is a primary C-channel.

15. An assembly according to claim 14, further comprising a secondary C-channel disposed in said primary C-channel, said secondary C-channel being slidable relative to said primary C-channel to enable pivotal movement of said transfigurable bed liner.

16. An assembly according to claim 12, wherein said mount is formed with said leg.

\* \* \* \* \*